June 13, 1961  B. GRIFFITH  2,987,896
DOUBLE UNIVERSAL JOINT
Filed March 30, 1959  3 Sheets-Sheet 1
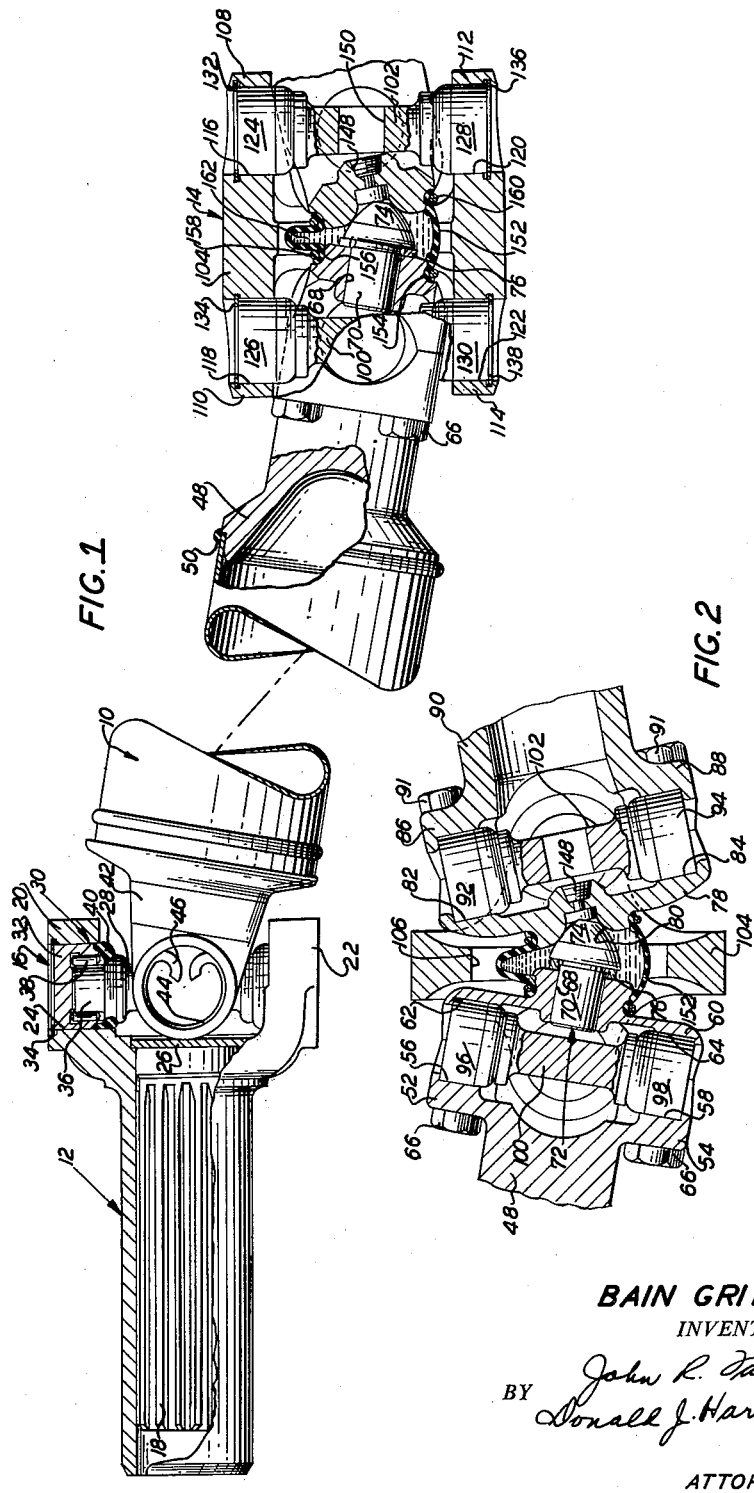
BAIN GRIFFITH
INVENTOR.
BY John R. Faulkner
Donald J. Harrington
ATTORNEYS June 13, 1961  B. GRIFFITH  2,987,896
DOUBLE UNIVERSAL JOINT
Filed March 30, 1959  3 Sheets-Sheet 2

BAIN GRIFFITH
INVENTOR.

BY John R. Faulkner
Donald J. Harrington

ATTORNEYS

BAIN GRIFFITH
INVENTOR.

United States Patent Office 2,987,896
Patented June 13, 1961

2,987,896
DOUBLE UNIVERSAL JOINT
Bain Griffith, Birmingham, Mich., assignor to Ford Motor Company, Dearborn, Mich., a corporation of Delaware
Filed Mar. 30, 1959, Ser. No. 802,823
15 Claims. (Cl. 64—21)

My invention relates generally to coupling and piloting mechanisms and more particularly to a new and improved universal joint capable of being used for coupling power delivery members in a driveline.

My improved universal joint finds particular utility in automotive vehicles for providing a driving connection between the power input pinion of a differential mechanism and the rearward end of a vehicle drive shaft, although it is also capable of being used in other environments. A slight amount of angularity normally exists between the central axis of the power input pinion of the differential and the axis of the drive shaft, and it is conventional practice to utilize a single Cardan or universal joint to compensate for the angularity.

Also, such a joint is capable of functioning during the substantially continuous vehicle displacement or jounce of the vehicle rear wheel suspension during road operation, and it provides a continuous power flow path to the differential mechanism. Compensation for the axial displacement of the differential mechanism relative to the drive shaft that accompanies vertical displacement of the vehicle suspension is normally provided by a splined slip yoke.

The angular velocity of the power input pinion of the differential mechanism for any given angular velocity of the drive shaft is not constant when a single universal joint of the conventional type is employed, and this is a major disadvantage of a single Cardan joint. The average angular velocities of the drive shaft and the power input pinion of the differential during any operating time interval are equal to each other, but the instantaneous angular velocity for the power input pinion of the differential for any drive shaft speed deviates from a maximum to a minimum for each one-half revolution of the drive shaft. The magnitude of the angular velocity deviation is dependent upon the extent of the angularity of the axis of the differential power input pinion and the axis of the drive shaft. Although this variation in velocities is not a serious problem in those cases where the drive shaft angularity is slight and where the driving speeds are relatively low, it is a serious disadvantage in driveline installations employing high speed engines or a high degree of drive shaft angularity. The pulsating velocity characteristic of such a joint gives rise to undesirable vibration and an increased rate of wear.

The improved double universal joint of my instant invention is a constant velocity joint which is designed to overcome the above-mentioned disadvantages of the single Cardan joint.

I am aware of other double universal joint constructions having a constant velocity characteristic which include a piloted centerpiece between axially spaced trunnion members. Vertical displacement or jouncing of the rear wheel suspension relative to the vehicle body and frame causes a change in the angularity of the drive shaft relative to the axis of the differential power input pinion, and compensation for the corresponding change in angularity of the drive shaft is obtained in such joints of known construction by means of relatively slidable portions of the centerpiece. These slidable portions are susceptible to wear and lubrication of this region of the joint is difficult. The improved joint of my instant invention is of the double Cardan type, but the piloted centerpiece does not include relatively slidable parts. Further, my improved joint is substantially simpler in construction than corresponding joints of known construction and it is more reliable in operation.

The provision of an improved double universal joint of the type above described being a principal object of my invention, it is a further object of my invention to provide an improved piloting means capable of automatically compensating for variations in drive shaft angularity.

It is a further object of my invention to provide a double universal joint with a uniform angular velocity characteristic wherein a minimum amount of sliding movement between the component parts is obtained.

A further object of my invention is to provide a double universal joint which is substantially simpler in construction and more reliable in operation than double universal joints of known construction.

It is a further object of my invention to provide a double universal joint which may be readily assembled and adjusted by conventional methods so that it maintains its adjustment after prolonged operation.

It is another object of my invention to provide a double universal joint having a pilot portion disposed between the individual Cardan portions and having means for hermetically sealing the pilot portion.

In carrying forth the foregoing objects, I have provided a double universal joint having a pair of juxtaposed coupling sections and having male and female pilot elements carried by the paired coupling sections. The pilot elements maintain the correct angularity between the driving and driven shafts and are capable of accommodating variations in this angularity while maintaining a continuous driving relationship between the shafts and a uniform angular velocity of the driven shaft.

According to a preferred embodiment of my invention, one of the pilot elements is formed with a concave region or recess, the longitudinal cross section of which defines an internal involute curve. The other pilot element forms an external involute curve when viewed in longitudinal cross section and it is adapted to contact the other pilot element along a conjugate involute profile, the center of the pitch circle of the conjugate involute profile being located on the trunnion bearing axis of the cooperating coupling section. Each pilot element therefore defines a surface of revolution which may be appropriately termed an involutoid, one pilot element being an external involutoid and the other element being an internal involutoid.

I contemplate that the pilot elements may define conjugate forms other than true involute forms. It is possible that pilot elements having a variety of other forms would be capable of conjugate action. For example, the recessed pilot element may be in the form of a cone and the cooperating male element may be characterized by a modified involutoid surface or a surface of other conjugate form. Other forms of cooperating conjugate surfaces may be of cycloidal form or of modified cycloidal form when viewed in longitudinal cross section.

For the purpose of particularly describing a preferred form of my instant invention, reference will be made to the accompanying drawings, wherein:

FIGURE 1 is an assembly view partly in cross section of an automotive vehicle drive shaft including the double Cardan joint of my instant invention;

FIGURE 2 is a longitudinal, cross sectional view of the double Cardan joint of FIGURE 1 taken along a plane disposed at 90° relative to the plane of FIGURE 1.

Figure 3:
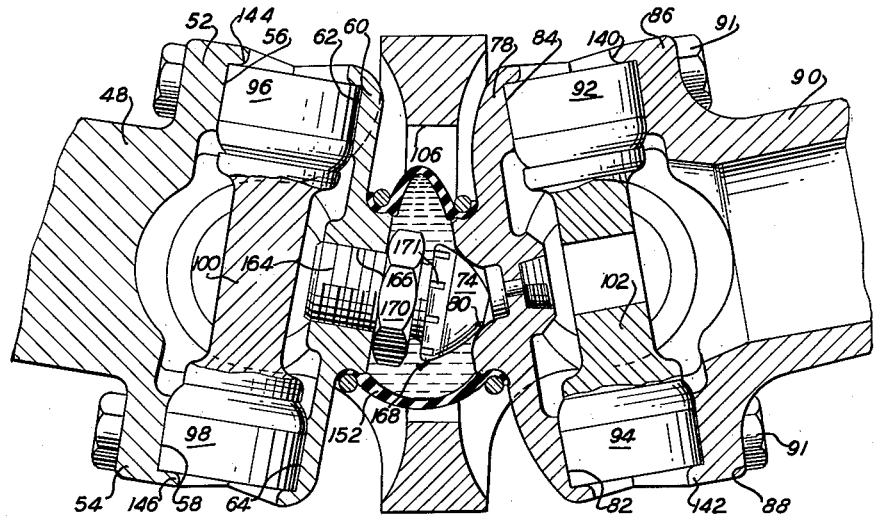
Figure 4:
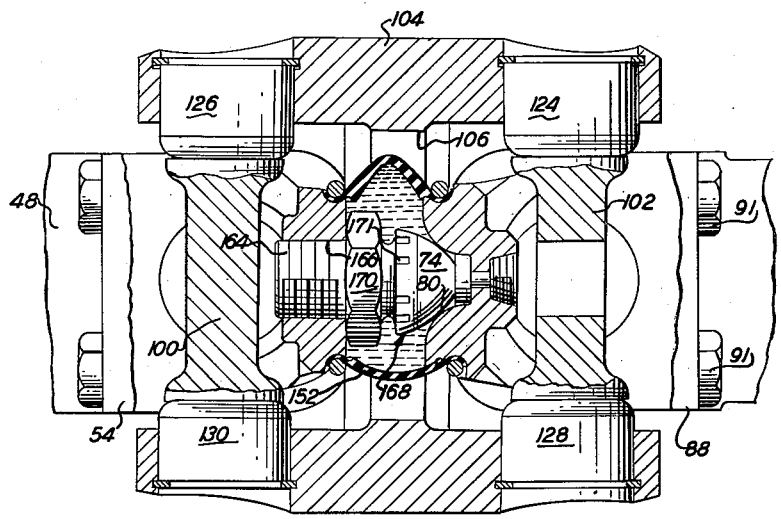
Figure 5:
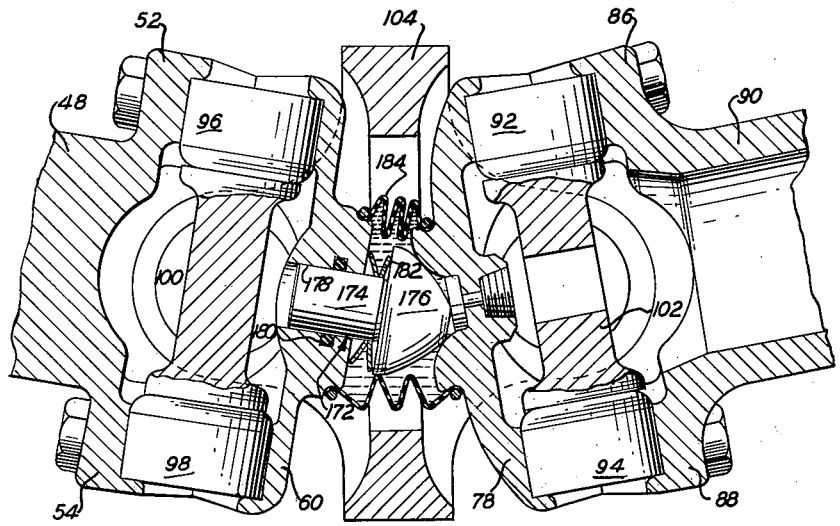
Figure 6:
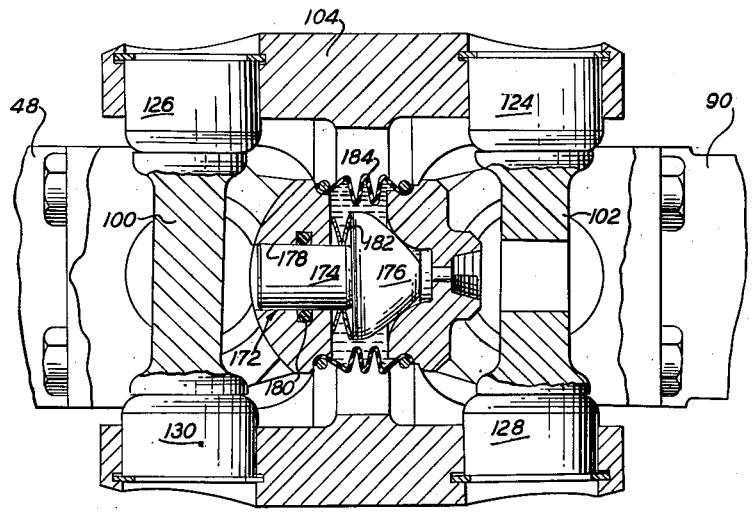

FIGURES 3 and 4 are cross sectional views of a modified double Cardan joint and are taken on planes situated 90° out of phase relative to each other; and FIGURES 5 and 6 are longitutinal, cross sectional views similar to those of FIGURES 1 and 2 showing a third modified pilot means.

Referring first to FIGURE 1, numeral 10 generally designates a tubular, automotive vehicle drive shaft and numeral 12 generally designates a drive shaft slip yoke which is adapted to be connected to the tailshaft for an automotive transmission in a conventional fashion. The double universal joint of my instant invention is generally designated by numeral 14 and it is normally situated at the rearward end of the drive shaft 10 for establishing a driving connection between the drive shaft 10 and the power input pinion for the differential mechanism. Since the angle formed by the transmission tailshaft and the axis of drive shaft 10 is of relatively reduced magnitude, the forward end of the drive shaft 10 may be coupled to the slip yoke 12 by means of a single universal joint 16 of conventional construction as illustrated.

The slip yoke 12 is internally splined as indicated by numeral 18 and is adapted to slidably receive an externally splined portion of the transmission tailshaft assembly.

The slip yoke 12 includes a pair of ears or arms 20 and 22 which are formed with transversely extending openings, one of which is shown at 24. The forward end of the central opening in slip yoke 12 is closed by a dust cap or cover 26 which is secured in place by means of a peripheral force fit.

A spider member 28 is positioned between the arms 20 and 22 and it is comprised of four extensions disposed in radially outward directions, said extensions being situated at 90° with respect to each other. The extremities of the sections are formed with trunnion bearings, one of which is shown at 30. As indicated, each bearing 30 comprises an outer bearing race 32 positioned within opening 24 formed in arm 20. A snap ring 34 may be used for retaining the race 32 in the position shown. An inner bearing race 36 is formed on the extremity of one of the extensions for the spider member 28 and a series of radial needle bearings 38 is assembled between the outer and inner races 32 and 36. Each bearing 30 is packed with suitable lubricant and a lip type lubricant seal 40 is positioned around the radial extensions of the spider member 28 in overlapping relationship with respect to the outer bearing races for the bearings 30.

The forward end of drive shaft 10 has permanently secured thereto a yoke 42 having spaced arms with openings 44 formed therein similar to opening 24 above described. A trunnion bearing similar to bearings 30 previously described is received in the openings 33 for yoke 42 and these bearings are adapted to journal the radially outward ends of two opposed extensions of the spider member 28. Snap rings 46 may be used for the purpose of retaining these bearings in position in the openings 44.

The rearward end of drive shaft 10 has permanently secured thereto a yoke 48. By preference, the juncture of the yoke 48 and drive shaft 10 is secured by a peripheral weld 50. As best seen in FIGURE 2, the yoke 48 is bifurcated to form a pair of arms 52 and 54. Each arm is formed with a bearing recess in the form of a semicircle, the recess for arm 52 being identified by numeral 56 and the recess for arm 54 being identified by numeral 58. A yoke piece or forging is shown at 60 and it bridges the spacing between arms 52 and 54. As indicated, the outer extremity of yoke piece 60 is formed with semicircular openings 62 and 64 and it is secured to arms 52 and 54 by means of bolts 66 which extend longitudinally relative to the axis of yoke 48.

The central region of forging 60 is formed with an axially extending opening 68 and it receives a shank 70 for an external involutoid pilot element or stud 72. The involute surface of the element 72 is identified by numeral 74. The involute surface 74 is a so-called surface of revolution and any longitudinal cross section thereof defines an involute curve. I prefer to call the element 72 an external involutoid and it is adapted to be held in proper stacked relationship relative to the cooperating parts of the joint by means of a spacer 76.

Another yoke piece is shown at 78 and it includes a central section which defines an involute cavity or socket 80 and the internal surface of the socket 80 is in the form of an involute when viewed in longitudinal cross section. The surface of the socket 80 is a surface of revolution and it may be appropriately termed an internal involutoid. The socket 80 cooperates with the surface 74 of stud 72 so that one will be piloted with respect to the other. Universal movement of the involutoid socket and stud is thus accommodated due to the involute action of these parts.

Yoke piece 78 is provided with semi-circular transverse recesses 82 and 84. The yoke piece 78 is adapted to bridge the space between flanges or arms 86 and 88 for axle assembly input shaft member 90, the latter being internally splined to accommodate a splined connection with the differential power input pinion of an automotive vehicle rear axle and differential assembly. Yoke piece 78 is secured to arms 86 and 88 by bolts 91. Arms 86 and 88 are each formed with a semi-circular recess extending transversely with respect to the shaft member 90, and these recesses are situated in juxtaposed relationship with respect to aforementioned recesses 82 and 84 to define bearing openings.

These bearing openings are adapted to receive therein trunnion bearing races 92 and 94 for trunnion bearings of the type previously described with relation to FIGURE 1. In a similar fashion, circular openings defined by recesses 56 and 62 and by recesses 58 and 64 receive therein outer races 96 and 98 for trunnion bearings of the type shown in FIGURE 1. A pair of spider members 100 and 102 are situated on either side of the involutoid elements and they are each formed with four radially extending portions which are angularly spaced at uniform angular intervals.

A centering ring is shown at 104 and it comprises a cylindrical portion disposed between the yoke pieces 60 and 78, and this cylindrical portion is internally apertured as shown at 106 to provide an adequate internal region within which the involutoid elements are disposed. The centering ring includes longitudinally extending journaled supports as best indicated in FIGURE 1, said supports being in the form of opposed longitudinal extensions 108 and 110 and longitudinal extensions 112 and 114. Each of these extensions 108 through 114 is formed with a cylindrical opening extending in a transverse direction, the openings being identified by numerals 116, 118, 120 and 122. Each of these openings is adapted to receive an outer race for a trunnion bearing of the type illustrated in FIGURE 1, and these bearing races are respectively identified by numerals 124, 126, 128 and 130. The trunnion bearings associated with bearing races 124 through 130 are situated at opposed ends of the two remaining extensions of each of the spider members 100 and 102. Snap rings are situated in internal snap ring grooves for each of the trunnion bearing openings for the center ring 104, said snap rings being identified by numerals 132, 134, 136 and 138.

The trunnion bearing openings for trunnion bearing races 92, 94, 96 and 98 are each formed with a lip as indicated at 140, 142, 144 and 146 respectively, thereby retaining the outer races of the corresponding trunnion bearings.

The recessed involutoid section of yoke piece 78 is formed with a threaded opening 148 adapted to receive a conventional grease fitting for lubrication purposes. A central opening 150 is formed in spider member 102 to permit access to the grease fitting. A grease retaining sleeve or boot of flexible material is shown at 152 and it surrounds the involutoid sections of the yoke pieces 78 and 60. Yoke piece 60 is formed with a groove 154 and yoke piece 78 is formed with a groove 156 to accommodate clamping members 158 and 160. The clamping members are adapted to retain boot 152 in sealing engagement with the involutoid sections of the yoke pieces 60 and 78, said boot forming a cavity for retaining grease or other suitable lubricant 162.

During operation, the double Cardan joint of my instant invention is capable of transferring rotary motion of drive shaft 10 to shaft member 90 when the angle defined by the center lines thereof is relatively large—for example, approximately 20°. The angular velocity of shaft member 90 is always equal to the angular velocity of drive shaft 10 and there are no angular velocity fluctuations as there are in single universal joints in which the operating angle is relatively large. The yoke pieces 60 and 78 are centered by means of the recessed involutoid section and the involutoid stud above described. A universal or three-dimensional involute action is obtained in this fashion.

When the involutoid stud and the recessed involutoid section are viewed in longitudinal cross section, the involute action is analogous to the involute action obtained with intermeshing involute gears and the involute surface 74 for the involutoid stud may be considered to be generated with a pitch circle having a center lying on the axis for the trunnion bearing corresponding to the bearing recesses 96 and 98. However, since the involute action is three-dimentional in character, the geometrical concept corresponding to the pitch circle of the two-dimensional involute is a so-called pitch sphere in which the center thereof lies on the point of intersection of the axes for the trunnion bearings associated with spider member 100. In a similar fashion, the pitch sphere for the recessed involutoid section of yoke piece 78 is the point of intersection of the axes for the trunnion bearings associated with spider member 102.

Referring next to FIGURES 3 and 4, I have illustrated an alternative construction for the involutoid stud previously described and it comprises a threaded shank 164 which is threadably received in a threaded opening 166 formed in yoke piece 60. This modified stud is identified in FIGURES 3 and 4 by numeral 168 and a lock nut 170 is threadably received thereon as indicated. Recesses 171 are formed in the head of stud 72 to accommodate a spanner wrench and to facilitate a suitable adjustment.

Under some circumstances it may be desirable to provide a certain degree of resiliency in the involutoid sections and this is accomplished in the embodiment in FIGURES 5 and 6. I have illustrated in FIGURES 5 and 6 a modified stud 172 having a cylindrical shank 174 and an involutoid surface 176. The shank 174 is slidably received in an opening 178 which is formed in the yoke piece 60. By preference, an O-ring fluid seal 180 is disposed about shank 174. A pair of Belleville type washers 182 are situated between the base of the involutoid surface 176 and yoke piece 60 thereby urging the stud 172 into continuous engagement with the mating recessed involutoid section for yoke piece 78.

A boot 184 corresponding to the aforementioned boot 152 is disposed in surrounding relationship relative to the involutoid members. The boot 184 is shaped in the form of a bellows although other configuratons may also be used.

I contemplate that a suitable nylon insert may be employed in the embodiment of FIGURES 3 and 4 for the purpose of retaining the stud 168 in locked engagement with the associated yoke piece 60. Also, I contemplate that the shank portion 164 of the stud 168 may be suitably recessed in the end to permit an adjustment of the same by means of an Allen wrench, a screw driver or some other suitable hand instrument. In such a modification the lock nut 170 would not be required. Further, the shank for the stud of the male pilot element may be slidably received in the cooperating pilot opening and a threaded insert may be positioned in this opening in engaging relationship relative to the stud for adjustably postioning the same.

I have designated corresponding parts in each of the disclosed embodiments by corresponding reference numerals in order to facilitate an understanding of my invention.

Although I have particularly described certain embodiments of my invention, I contemplate that other variations therein may be made by persons skilled in this art without departing from the scope of my instant invention as defined by the following claims.

I claim:

1. A constant velocity, double universal joint adapted to transfer rotary motion from a rotary driving member to a rotary driven member comprising a centering ring, first coupling means for providing a first universal connection between said driving member and said centering ring, second coupling means for providing a second universal connection between said driven member and said centering ring, an internal involutoid carried by one of said coupling means, and an external involutoid carried by the other coupling means, said external involutoid being received in said internal involutoid to provide universal involute action therebetween.

2. A constant velocity, double universal joint adapted to transfer rotary motion from a rotary driving member to a rotary driven member comprising a centering ring, first coupling means for providing a first universal connection between said driving member and said centering ring, second coupling means for providing a second universal connection between said driven member and said centering ring, an internal involutoid carried by one of said coupling means, and an external involutoid carried by the other coupling means, said external involutoid being received in said internal involutoid to provide universal involute action therebetween, said centering ring being centrally apertured and said involutoids being disposed within the same.

3. In a constant velocity, double universal joint adapted to transfer rotary motion from a rotary driving member to a rotary driven member, a double Cardan coupling connection between said driving and driven members, and a pilot means for piloting one portion of said coupling connection relative to another, said one portion defining an internal involutoid and said other portion defining an external involutoid, said external involutoid being piloted within said internal involutoid to accommodate a universal involute action between said coupling portions.

4. In a constant velocity, double universal joint adapted to transfer rotary motion from a rotary driving member to a rotary driven member, a coupling member forming two pairs of yoke arms, a first yoke member carried by said driving member, a second yoke member carried by said driven member, a pair of spider members having four trunnions carried thereby at equally spaced locations, said first yoke and one of said pairs of yoke arms formed on said coupling member being independently journaled on one of said spider members, said second member and the other of said pairs of yoke arms formed on said coupling member being journaled on the other spider member, a first yoke piece connected to said first yoke member, a second yoke piece connected to said second yoke member, and intermeshed involutoid pilot elements carried by said yoke pieces.

5. In a constant velocity, double universal joint adapted to transfer rotary motion from a rotary driving member to a rotary driven member, a coupling member forming two pairs of yoke arms, a first yoke member carried by said driving member, a second yoke member carried by said driven member, a pair of spider members having four trunnions carried thereby at equally spaced locations, said first yoke and one of said pairs of yoke arms formed on said coupling member being independently journaled on one of said spider members, said second member and the other of said pairs of yoke arms formed on said coupling member being journaled on the other spider member, a first yoke piece connected to said first yoke member, a second yoke piece connected to said second yoke member, and intermeshed involutoid pilot elements carried by said yoke pieces, one of said involutoid pilot elements forming an external involutoid and the other forming an internal involutoid, one of said involutoids being threadably connected to the associated yoke piece and adapted to be threadably adjusted relative to the other involutoid into cooperating mating engagement therewith.

6. In a constant velocity, double universal joint adapted to transfer rotary motion from a rotary driving member to a rotary driven member, a coupling member forming two pairs of yoke arms, a first yoke member carried by said driving member, a second yoke member carried by said driven member, a pair of spider members having four trunnions carried thereby at equally spaced locations, said first yoke and one of said pairs of yoke arms formed on said coupling member being independently journaled on one of said spider members, said second member and the other of said pairs of yoke arms formed on said coupling member being journaled on the other spider member, a first yoke piece connected to said first yoke member, a second yoke piece connected to said second yoke member, and intermeshed involutoid pilot elements carried by said yoke pieces, one of said involutoid pilot elements forming an external involutoid and the other forming an internal involutoid, one of said involutoids being adjustably carried by the associated yoke piece, and spacer means for maintaining a predetermined spaced relationship between said involutoids to accommodate universal involute action therebetween.

7. The combination as set forth in claim 5 whereby said one involutoid is adjustably carried by the associated yoke piece and whereby resilient means are provided for urging said involutoids into cooperating mating relationship to accommodate universal involute action therebetween.

8. A constant velocity, double universal joint for drivably connecting a driving member and a driven member comprising a coupling member, a first universal connection between said driving member and said coupling member, a second universal connection between said driven member and said coupling member, and pilot means for piloting juxtaposed portions of said first connection and said second connection, said pilot means including a first pilot element carried by one of said portions and defining an external involutoid, and a second pilot element carried by the other portion and defining an internal involutoid, said involutoids being intermeshed to accommodate universal involute piloting action therebetween.

9. The combination as set forth in claim 8 wherein one of said portions includes means for injecting lubricant into the working region of said involutoids.

10. A constant velocity, double universal joint for drivably connecting a driving member and a driven member comprising a coupling member, a first universal connection between said driving member and said coupling member, a second universal connection between said driven member and said coupling member, and pilot means for piloting juxtaposed portions of said first connection and said second connection, said pilot means including a first pilot element carried by one of said portions and defining an external involutoid, and a second pilot element carried by the other portion and defining an internal involutoid, said involutoids being intermeshed to accommodate universal involute piloting action therebetween, one of said portions including means for injecting lubricant into the working region of said involutoids, and a grease retaining boot surrounding said involutoids, said boot being joined to said juxtaposed portions.

11. A constant velocity, double universal joint for drivably connecting a driving member and a driven member comprising a coupling member, a first universal connection between said driving member and said coupling member, a second universal connection between said driven member and said coupling member, and pilot means for piloting juxtaposed portions of said first connection and said second connection, said pilot means including a first pilot element carried by one of said portions and defining an external involutoid, and a second pilot element carried by the other portion and defining an internal involutoid, said involutoids being intermeshed to accommodate universal involute piloting action therebetween, said external involutoid being threadably connected to said one portion whereby a threaded adjustment of the same relative to said internal involutoid may be effected.

12. A constant velocity, double universal joint for drivably connecting a driving member and a driven member comprising a coupling member, a first universal connection between said driving member and said coupling member, a second universal connection between said driven member and said coupling member, and pilot means for piloting juxtaposed portions of said first connection and said second connection, said pilot means including a first pilot element carried by one of said portions and defining an external involutoid, and a second pilot element carried by the other portion and defining an internal involutoid, said involutoids being intermeshed to accommodate universal involute piloting action therebetween, said external involutoid being adjustably carried by said one portion, and spacer means for maintaining a predetermined spaced relationship between said involutoids.

13. A constant velocity, double universal joint for drivably connecting a driving member and a driven member comprising a coupling member, a first universal connection between said driving member and said coupling member, a second universal connection between said driven member and said coupling member, and pilot means for piloting juxtaposed portions of said first connection and said second connection, said pilot means including a first pilot element carried by one of said portions, and a second pilot element carried by the other portion, said pilot elements being intermeshed to accommodate universal conjugate action therebetween, said first pilot element being adjustably carried by said one portion.

14. A constant velocity, double universal joint for drivably connecting a driving member and a driven member comprising a coupling member, a first universal connection between said driving member and said coupling member, a second universal connection between said driven member and said coupling member, and pilot means for piloting juxtaposed portions of said first connection and said second connection, said pilot means including a first pilot element carried by one of said portions and defining an external involutoid, and a second pilot element carried by the other portion and defining an internal involutoid, said involutoids being intermeshed to accommodate universal involute piloting action therebetween, said external involutoid being adjustably carried by said one portion, and means for resiliently urging the same into mating engagement with said internal involutoid.

15. A constant velocity, double universal joint for drivably connecting a driving member and a driven member comprising a coupling member, a first universal connection between said driving member and said coupling member, a second universal connection between said driven member and said coupling member, and pilot means for piloting juxtaposed portions of said first and second connections, said pilot means including a first pilot element carried by one of said portions and a second pilot element carried by the other portion, said pilot elements being intermeshed, the cooperating portions of said pilot elements being of conjugate form capable of accommodating universal conjugate action therebetween.

(References on following page)

References Cited in the file of this patent

UNITED STATES PATENTS

| | | |
|---|---|---|
| 1,911,214 | Van Ranst | May 30, 1933 |
| 2,329,903 | Horne | Sept. 21, 1943 |
| 2,553,020 | Urschel | May 15, 1951 |
| 2,627,734 | Villard | Feb. 10, 1953 |

FOREIGN PATENTS

| | | |
|---|---|---|
| 377,760 | Great Britain | Aug. 4, 1932 |
| 637,176 | Germany | Oct. 26, 1936 |
| 997,928 | France | Sept. 19, 1951 |
| 1,012,165 | France | Apr. 9, 1952 |